United States Patent [19]

Matsuura

[11] Patent Number: 5,071,252
[45] Date of Patent: Dec. 10, 1991

[54] METHOD FOR CONTACTLESS PROFILING NORMAL TO A SURFACE

[75] Inventor: Hitoshi Matsuura, Tokyo, Japan
[73] Assignee: Fanuc Ltd., Minamitsuru, Japan
[21] Appl. No.: 343,261
[22] PCT Filed: Aug. 31, 1988
[86] PCT No.: PCT/JP88/00863
    § 371 Date: Apr. 17, 1989
    § 102(e) Date: Apr. 17, 1989
[87] PCT Pub. No.: WO89/01845
    PCT Pub. Date: Mar. 9, 1989

[30] Foreign Application Priority Data

Sep. 2, 1987 [JP] Japan ................................ 62-219746

[51] Int. Cl.$^5$ ...................... G01B 11/24; G01B 11/14; G01C 3/08
[52] U.S. Cl. .................................... 356/376; 356/375; 356/4
[58] Field of Search ...................... 356/375, 376, 1, 4; 364/560

[56] References Cited

U.S. PATENT DOCUMENTS 4,479,717 10/1984 Cornillault .......................... 356/375
4,789,243 12/1988 Mathur ................................ 356/375

Primary Examiner—F. L. Evans
Assistant Examiner—K. P. Hantis
Attorney, Agent, or Firm—Staas & Halsey

[57] ABSTRACT

The present invention provides a contactless profiling method for tracing a model surface (MDL) while performing attitude control in such a manner that an optic axis (OP1) of a contactless probe (PRB), which is capable of simultaneously measuring distances to three points on the model surface, is pointed along the direction of a line normal to the model surface at all times. In this contactless profiling method, model normal line direction N at a measurement point A is calculated first from an inclination angle increment in a probe feed direction (X direction), which is obtained using distances, $L_1$, $L_2$ to two points A, B in the probe feed direction measured every predetermined sampling time $T_s$, and second from an inclination angle increment in a perpendicular direction (Y direction) obtained using two points A, C in the peripendicular direction. Next, total incremental quantities every sampling time $T_s$ along the three axes of the rectangular coordinate system and the two axes of probe rotation are calculated by using (i) incremental quantities found along three axes of a retangular coordinate system and two axes of probe rotation; (ii) incremental quantities found in the feed direction (X direction) and profiling direction (Z direction) determined from tracing velocity and inclination angle in the probe feed direction; and (iii) a Z-axis component of an error between the distance $L_1$, which is measured by first distance measuring means (DM1) every sampling time $T_s$, and a reference distance $L_0$.

28 Claims, 5 Drawing Sheets

METHOD FOR CONTACTLESS PROFILING NORMAL TO A SURFACE

BACKGROUND OF THE INVENTION

1. Technical Field of the Invention

This invention relates to a contactless profiling method and, more particularly, to a contactless profiling method for tracing a model surface while performing attitude control in such a manner that the optic axis of a contactless probe, which is capable of simultaneously measuring distances to three points on the model surface, is pointed in the direction of a line normal to the model surface at all times.

2. Description of the Related Art

In conventional tracer control, a stylus is moved while made to contact a model. A tracing velocity is generated along each axis by performing tracing computations using three-dimensional axial deviations produced by tracer head contact between the stylus and the model. The model is traced, while the stylus is made to contact the model surface, in accordance with the velocity signals along the respective axes.

Because the stylus contacts the model, the stylus sustains wear and must be replaced unless the tracing velocity is made to exceed a certain value. Highly accurate tracer control will not be possible unless the stylus is not replaced. Accordingly, a contactless tracer control method has been proposed in which a model surface is traced by a distance measuring probe capable of measuring distance in contactless fashion.

FIG. 7 is a view illustrating the general features of contactless profiling. Contactless profiling refers to a profiling method in which the probe is made to trace the surface of a model MDL without contacting it by making use of a probe sensor (a distance measuring probe) PB which is capable of measuring distance without contact as in the manner of a laser distance measuring probe. The contactless-type distance measuring probe PB generally includes a reference distance $L_0$ and is so adapted that the difference between an actually measured distance L and the reference distance $L_0$ is capable of being output as an error quantity $\Delta L$. A probe which employs, e.g., an optical triangulation distance measuring method, is available as the a contactless-type distance measuring probe. In a probe of this kind, laser light produced by a light-emitting element (a semiconductor laser) irradiates the model surface via a projecting lens, and part of the light beam scattered and reflected at such time forms a spot on a position detecting element via a light-receiving lens. The position of the spot varies depending upon the distance to the model surface, thereby allowing measurement of the distance.

Assume that the model MDL shown in FIG. 7 is to be profiled, and that points A, B, C are suitably selected sampling points (measurement points). When a distance $L_1$ ($=L_0+\Delta L_1$) at point A is measured and gives an error of $\Delta L_1$ in comparison with the reference distance $L_0$, the probe is directed to the next sampling point B while a corrective operation is applied along the measurement axis (along the optic axis) in an amount corresponding to the error. An error quantity $\Delta L_2$ is then obtained at the point B and the probe is directed to point C so as to similarly apply a correction corresponding to this error. By subsequently repeating identical processing, the model surface can be traced contactlessly while the distance $L_0$ is maintained.

The above-described contactless-type distance measuring probe is capable of measurement in one dimension only, namely along the measurement axis. As a consequence, the larger the angle $\theta$ between the measurement optic axis AX and the model surface, as shown in FIG. 8(a), the more the accuracy of distance measurement deteriorates, giving rise to a range within which measurement is impossible. With the proposed contactless-type profiling method, therefore, the profiling range is limited. When the angle $\theta$ becomes too large, contactless profiling can no longer be applied.

In order to mitigate this limitation as much as possible, the probe PB should be rotated through a predetermined angle about its rotational axis $R_C$ in the tracing plane (e.g., the X-Z plane) to control the measurement optic axis AX in such a manner that it will lie at right angles to the model surface at all times. As shown in FIGS. 8(b) and 9, the measurement optic axis should be controlled so as to be perpendicular to the model surface even where it is cut by a plane (the Y-Z plane) perpendicular to the tracing plane. In other words, if the optic axis is controlled so as to point along the direction of the normal to the model surface at all times, distance can be measured accurately at all times irrespective of the model shape and the range over which contactless profiling is possible can be enlarged.

However, an effective method of performing contactless profiling while pointing the optic axis in the direction of a line normal to a model surface has not yet been proposed.

SUMMARY OF THE INVENTION

The present invention has been devised in view of the foregoing problems encountered in the prior art and its object is to provide a contactless profiling method through which profiling can be performed while the optic axis of a contactless probe is pointed along the direction of a normal to a model surface.

The present invention relates to a contactless profiling method for tracing a model surface while performing attitude control in such a manner that an optic axis of a contactless probe, which is capable of simultaneously measuring distances to three points on the model surface, is pointed along the direction of a line normal to the model surface at all times. In accordance with the contactless profiling method, model normal line direction N at a measurement point A is calculated first from an inclination angle increment in a probe feed direction (X direction), which is obtained using distances $L_1$, $L_2$ to two points A, B in the probe feed direction measured every predetermined sampling time $T_S$, and second from an inclination angle increment in a perpendicular direction (Y direction) obtained using two points A, C in the perpendicular direction.

Next, total incremental quantities every sampling time $T_S$ along the three axes of the rectangular coordinate system and the two axes of probe rotation are calculated by using (i) incremental quantities found along three axes of a rectangular coordinate system and two axes of probe rotation, these incremental quantities being necessary for pointing the optic axis along the normal line direction in a state where the measurement point A, which is a point of intersection between the optic axis of first distance measuring means and the model surface, is fixed; (ii) incremental quantities found in the feed direction (X direction) and profiling direction (Z direction), every predetermined sampling time $T_S$, determined from tracing velocity and inclination angle in the probe feed direction; and (iii) a Z-axis component of an error between the distance $L_1$, which is measured by the first distance measuring means every sampling time $T_S$, and a reference distance $L_0$. By performing simultaneous five-axis control using these total incremental quantities along the respective axes, the model is profiled while the optic axis is pointed along the direction of the line normal to the surface of the model.

DESCRIPTION OF THE PREFERRED EMBODIMENT

The present invention performs contactless profiling while pointing an optic axis along the direction of a line normal to the surface of a model. The contactless profiling method of the present invention will now be described with reference to FIGS. 1 through 5.

Figure 1:
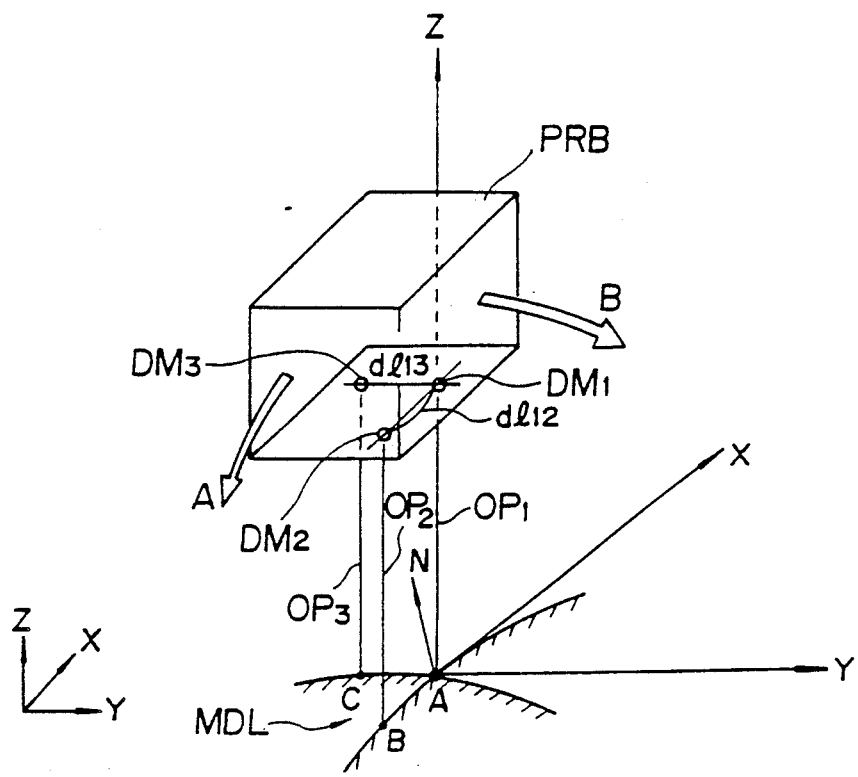
FIG. 1 is a three dimensional view illustrating the general features of the present invention.

FIG. 1 is a three-dimensional view illustrating the general features of the present invention in which PRB denotes a contactless-type distance measuring probe, MDL a model, DM1 through DM3 optical-type distance measuring means, OP1 through OP3, optic axes of the optical-type distance measuring means, and A, B and C as points measured by the distance measuring means DM1 through DM3. The XZ plane is a profiling plane in surface profiling. The X direction is the probe feed direction, and the Z direction is the profiling direction. The YZ plane is a perpendicular cross section perpendicular to the profiling plane. Though the optical-type distance measuring means DM1 through DM3 are illustrated merely by the circular marks for convenience sake, each is so constructed that laser light produced by a light-emitting element (a semiconductor laser) irradiates the model surface via a projecting lens, with part of the light beam scattered and reflected at such time forming a spot on a position detecting element via a light-receiving lens. The position of the spot varies depending upon the distance to the model surface, thereby allowing measurement of the distance.

Distance measuring probe PRB is provided with the first through third optical-type distance measuring means DM1–DM3 so that the distances to at least the three points A–C on model MDL can be measured simultaneously. The first and second optical-type distance measuring means DM1, DM2 are arranged parallel to the probe feed direction (X direction) and are spaced apart from each other by a distance $dl_{12}$. The third optical-type distance measuring means DM3 is arranged at a distance $dl_{13}$ from the first optical-type distance measuring means DM1 in a direction (Y direction) perpendicular to the probe feed direction.

Figure 2:
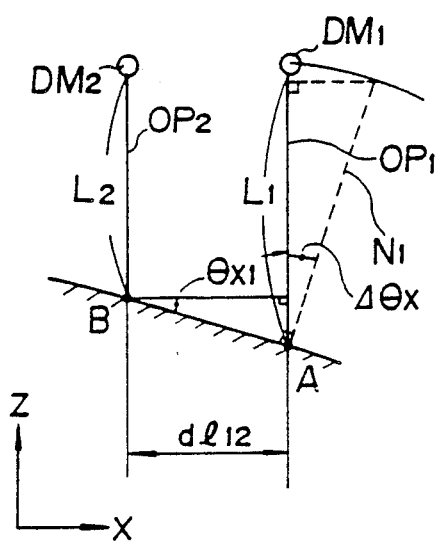
FIG. 2 is a three dimensional view illustrating an increment in an angle of inclination.

FIG. 2 is a two-dimensional view illustrating a computation method through which an increment $\Delta\theta_x$ of the angle of inclination of a normal line in the probe feed direction (X direction) is computed using distances $L_1$, $L_2$ to the model surface measured by the two distance measuring means DM1, DM2 juxtaposed in the probe feed direction. Based on the drawing, the increment $\Delta\theta_x$ of the angle of inclination is obtained as $$\Delta\theta_x = \tan^{-1}(L_1 - L_2)/dl_{12} \quad (1)$$

Similarly, an increment $\Delta\theta_y$ of the angle of inclination of the normal line in the Y direction is obtained by $$\Delta\theta_y = \tan^{-1}(L_1 - L_3)/dl_{13} \quad (2)$$

using distances $L_1$, $L_3$ to the model surface measured by the two distance measuring means DM1, DM3 juxtaposed in the direction (Y direction) perpendicular to the probe feed direction.

Accordingly, assume that optic axis OP1 is pointing along the direction of the line normal to the model surface at a certain sampling time $T_1$ and that the angles of inclination along the X and Y directions at this time are $\theta_{x1}$, $\theta_{y1}$, respectively. If the optic axis OP1 is moved by contactless profiling along the model surface without causing the direction of this optic axis to change, so that the state indicated by the solid line in FIG. 2 is obtained at the next sampling time $T_2$ ($T_2 = T_1 + T_S$, where $T_S$ is the sampling period), then the angle of inclination $\theta_{x2}$ in the X direction and the angle of inclination $\theta_{y2}$ in the Y direction at point A will be as follows, respectively:

$$\theta_{x2} = \theta_{x1} + \Delta\theta_x \quad (3)$$

$$\theta_{y2} = \theta_{y1} + \Delta\theta_y \quad (4)$$

It will suffice to point the optic axis in this direction.

Figure 3:
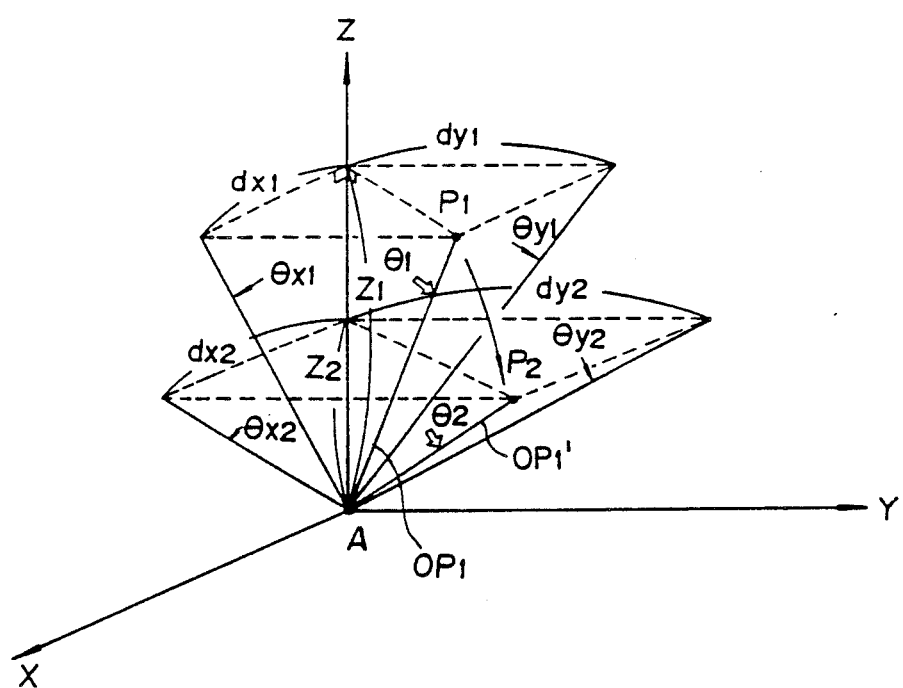
FIG. 3 is a three dimensional view illustrating a method of computing incremental quantities along respective axes for pointing an optic axis along the direction of a normal line.

FIG. 3 is an explanatory view showing the optic axis at measurement point A before OP1 and after OP1' this axis is pointed along the direction of the normal line. Point $P_1$ represent the center of rotation of the optic axis OP1, namely a point about which the probe is rotated, and $\theta_1$ represents an angle defined by the optic axis OP1 and the Z axis, before the optic axis is pointed along the normal direction. Point $P_2$ represents the center of radial rotation of the optic axis OP1 and $\theta_2$ represents an angle defined by the optic axis OP1 and the Z axis after the optic axis is pointed along the normal direction. It should be noted that the three-dimensional coordinate system is so established that the point of intersection (measurement point) A of the optic axis OP1 and the model surface becomes the origin of the coordinate system. Also, $\theta_{x1}$, $\theta_{y1}$, $\theta_{x2}$, $\theta_{y2}$ are angles measured from the Z axis and given by Eqs. (1) through (4), respectively.

As will be apparent from FIG. 3, the angles $\theta_1$, $\theta_2$ are given by the following equations:

$$\theta_1 = \tan^{-1}(\sqrt{\tan^2\theta_{x1} + \tan^2\theta_{y1}}) \quad (5)$$

$$\theta_2 = \tan^{-1}(\sqrt{\tan^2\theta_{x2} + \tan^2\theta_{y2}}) \quad (6)$$

Accordingly, the Z coordinates $Z_1$, $Z_2$ of the rotational centers $P_1$, $P_2$ are given by the following equations:

$$Z_1 = L_1 \cdot \cos \theta_1 \tag{7}$$

$$Z_2 = L_1 \cdot \cos \theta_2 \tag{8}$$

(where $L_1$ is the distance to the measurement point A). The X, Y coordinates $dx_1$, $dy_1$, $dx_2$, $dy_2$ of the rotational centers $P_1$, $P_2$ are given by the following equations:

$$\begin{aligned}
dx_1 &= L_1 \cdot \cos\theta_1 \cdot \tan\theta_{x1} & (9) \\
dy_1 &= L_1 \cdot \cos\theta_1 \cdot \tan\theta_{y1} & (10) \\
dx_2 &= L_1 \cdot \cos\theta_2 \cdot \tan\theta_{x2} & (11) \\
dy_2 &= L_1 \cdot \cos\theta_2 \cdot \tan\theta_{y2} & (12)
\end{aligned}$$

From the above, incremental quantities $\Delta x$, $\Delta y$, $\Delta z$, $\Delta\theta_x$, $\Delta\theta_y$ along the three axes of the rectangular coordinate system and along the two axes of rotation of the probe, which quantities are necessary for pointing the optic axis OP1 along the direction of the normal line without moving (changing) the measurement point that is the point of intersection between the optic axis OP1 and the model surface, are obtained as follows:

$$\begin{aligned}
\Delta^x &= dx_2 - dx_1 \\
&= L_1(\cos\theta_2 \cdot \tan\theta_{x2} - \cos\theta_1 \cdot \tan\theta_{x1})
\end{aligned} \tag{13}$$

$$\begin{aligned}
\Delta^y &= dy_2 - dy_1 \\
&= L_1(\cos\theta_2 \cdot \tan\theta_{y2} - \cos\theta_1 \cdot \tan\theta_{y1})
\end{aligned} \tag{14}$$

$$\begin{aligned}
\Delta^z &= z_2 - z_1 \\
&= L_1(\cos\theta_2 - \cos\theta_1)
\end{aligned} \tag{15}$$

$$\Delta\theta_x = \theta_{x2} - \theta_{x1} = \tan^{-1}(L_2 - L_1)/dl_{12} \tag{16}$$

$$\Delta\theta_y = \theta_{y2} - \theta_{y1} = \tan^{-1}(L_3 - L_1)/dl_{13} \tag{17}$$

Figure 4:
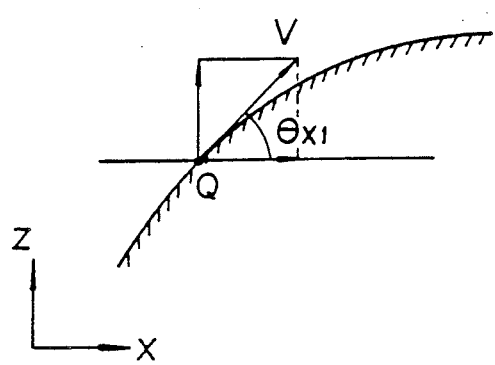
FIGS. 4 and 5 are two-dimensional and three-dimensional views, respectively illustrating a method of computing incremental quantities for tracing a contactless probe on a model.
Figure 5:
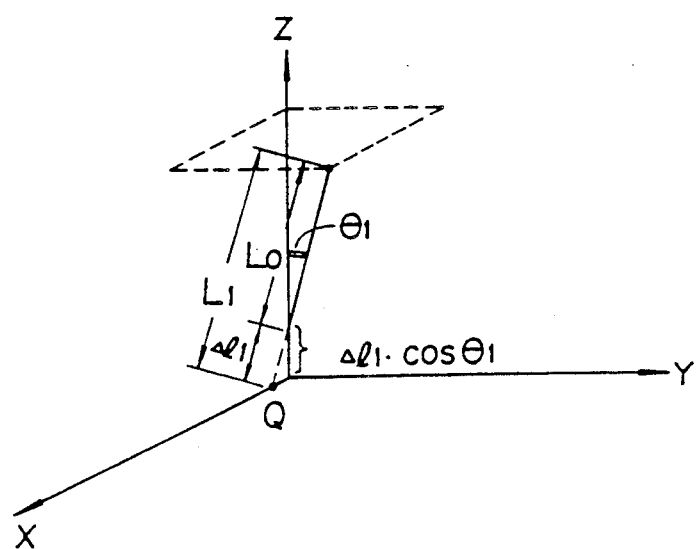

The foregoing is the description of the method of finding the incremental quantities along the three axes of the rectangular coordinate system and the two axes of rotation of the probe necessary for pointing the optic axis OP1 along the direction of the normal line without moving (changing) the measurement point that is the point of intersection between the optic axis OP1 and the model surface. However, contactless profiling of the model surface cannot be most accurately performed using solely the foregoing incremental quantities $\Delta x$, $\Delta y$, $\Delta z$, $\Delta\theta_x$, $\Delta\theta_y$. Reference will now be had to FIGS. 4 and 5 to describe controlled variables for performing contactless profiling along the model surface.

In order to trace the model surface, where the XZ plane is adopted as the profiling plane, and where V is a commanded tracing velocity and $\theta_{x1}$ is the angle of inclination (the angle of the contact direction) at point Q on the model with respect to the probe feed axis (X axis) in the profiling plane of the XZ surface, it will suffice to effect movement at the velocities given by the equations:

$$V_x = V \cdot \cos \theta_{x1}$$

$$V_z = V \cdot \sin \theta_{x1}$$

in the feed direction (X direction) and profiling direction (Z direction) and correct the Z-axis feed quantity by $\Delta l_1 \cos \theta_1$ in such a manner that an error $\Delta l$ ($= L_1 - L_0$) between the distance $L_1$ (see FIG. 5), which is measured by the distance measuring means DM1, and a reference distance $L_0$ becomes zero.

Accordingly, letting $T_S$ represent the sampling time for computing the axial incremental quantities of Eqs. (13)–(17) which point the optic axis in the direction of the normal line, distances $\Delta X_Q$, $\Delta Z_Q$ for travel at the velocities $V_x$, $V_y$ during the sampling time are as follows:

$$\Delta X_Q = V \cdot \cos \theta_{x1} \cdot T_S \tag{18}$$

$$\Delta Z_Q = V \cdot \sin \theta_{x1} \cdot T_S \tag{19}$$

Therefore, it will suffice to add the abovementioned distances (incremental quantities) to the incremental quantities $\Delta x$, $\Delta y$ indicated by Eqs. (13), (15) and correct the Z-axis incremental quantity by $\Delta l_1 \cos \theta_1$.

From the foregoing, axial incremental quantities for every sampling time $T_S$ to perform contactless profiling while the optic axis OP1 of the distance measuring means is pointed along the direction of the normal to the model surface, and in such a manner that the measured distance will become equal to the reference distance $L_0$, are given by the following:

$$\left.\begin{aligned}
\Delta^X &= L_1(\cos\theta_2 \cdot \tan\theta_{x2} - \cos\theta_1 \cdot \tan\theta_{x1}) + \Delta^X_Q \\
\Delta^Y &= L_1(\cos\theta_2 \cdot \tan\theta_{y2} - \cos\theta_1 \cdot \tan\theta_{y1}) \\
\Delta^Z &= L_1(\cos\theta_2 - \cos\theta_1) + \Delta^Z_Q + \Delta l_1 \cdot \cos\theta_1 \\
\Delta\theta_x &= \theta_{x2} - \theta_{x1} = \tan^{-1}(L_2 - L_1)/dl_{12} \\
\Delta\theta_y &= \theta_{y2} - \theta_{y1} = \tan^{-1}(L_3 - L_1)/dl_{13}
\end{aligned}\right\} \tag{20}$$

Figure 6:
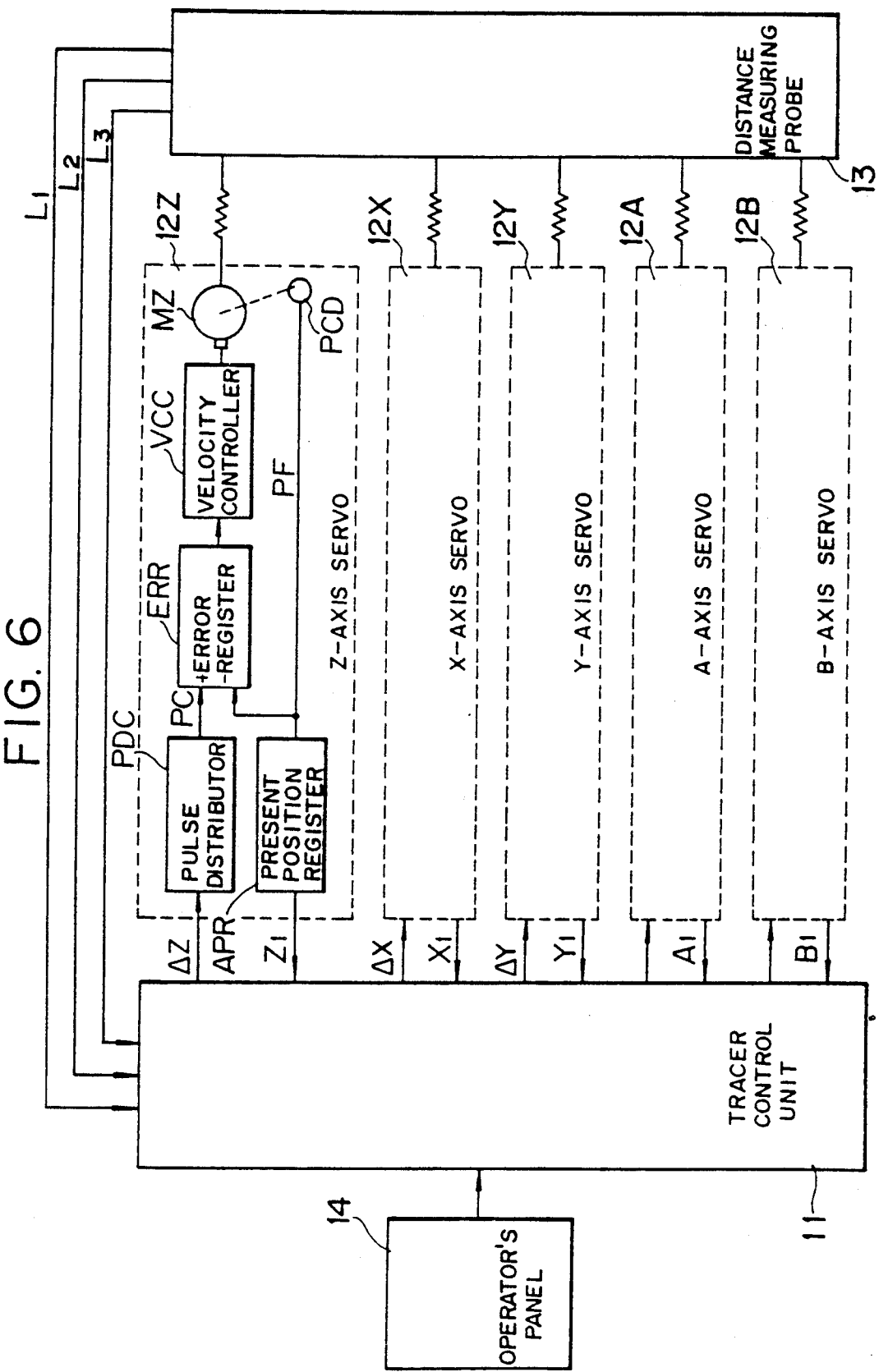
FIG. 6 is a block diagram of a system for practicing the method of the present invention.
Figure 7:
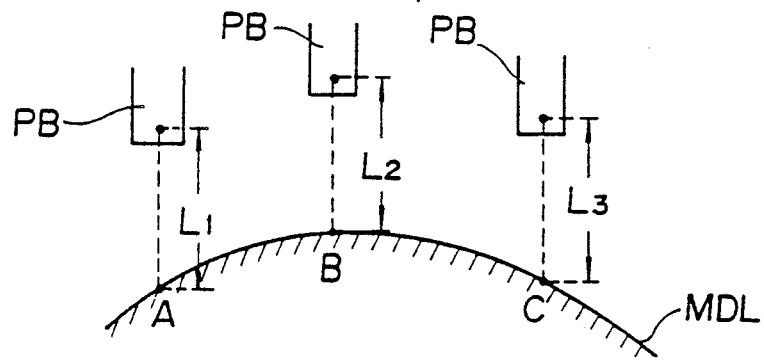
FIGS. 7, 8(a), 8(b) and 9 are two dimensional views illustrating general features and problems of contactless profiling.
Figure 8A:
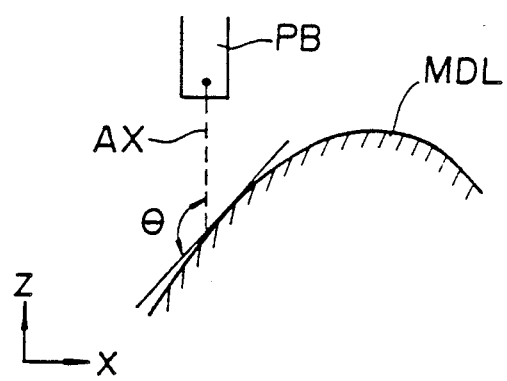
Figure 8B:
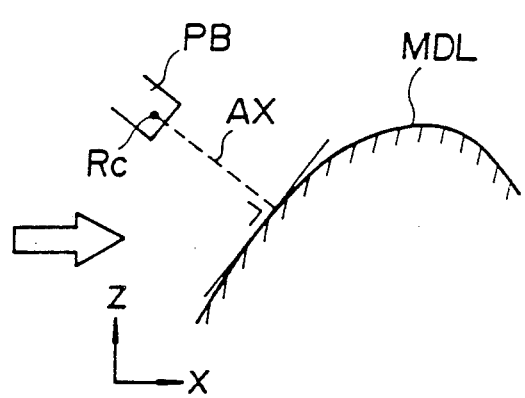
Figure 9:
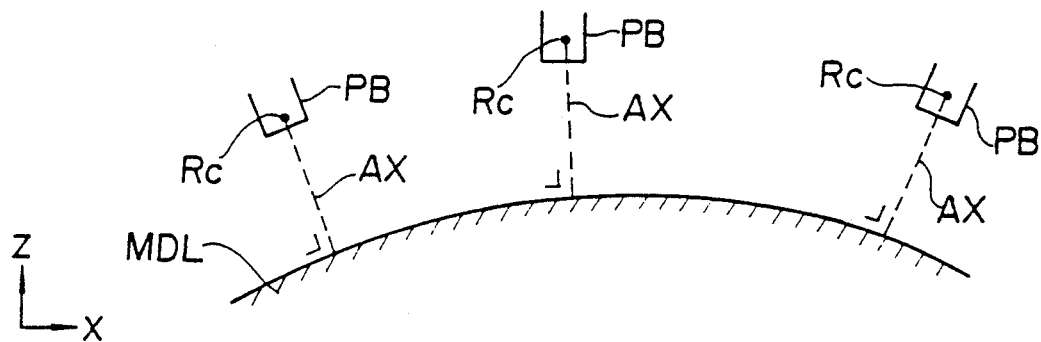

FIG. 6 is a block diagram of a system for practicing the contactless profiling method of the present invention. Tracer control unit, 11 connects to Z-axis 12Z, X-axis servo-circuit 12X, Y-axis servo-circuit 12Y, 12A an A-axis (e.g., an axis of rotation of the optic axis in the XZ profiling plane; see FIG. 1) servo-circuit 12A, B-axis (e.g., an axis of rotation of the optic axis in a YZ cross-section perpendicular to the XZ profiling plane) servo-circuit 12B and distance measuring probe 13 having the arrangement of FIG. 1 and capable of simultaneously measuring distances to three points on the model. Operator's panel 14 connects to tracer control unit 11 for setting data values necessary for contactless profiling such as the tracing velocity V, the profiling method (assumed, preferably, to be profiling), the profiling plane, the feed direction, pick-feed quantity, the profiling range, etc. each of servo-circuits 12Z through 12B for the respective axes all have the same structure. Thus only the Z-axis servo-circuit 12Z is illustrated in detail, Z-axis servo-circuit 12Z has a pulse distributing circuit PDC to which a Z-axis incremental value $\Delta Z$ is applied every sampling time $T_S$ for performing a pulse distribution computation. An error register (up/down counter) ERR for accumulating (increments) command pulses output from pulse distributing circuit PDC and decrements (decummulates) its content in the zero direction in dependence upon actual movement whenever a pulse PF is generated by pulse coder PCD. Velocity control circuit VCC controls Z-axis servomotor M2 based on an analog voltage proportional to the counted value in the error register ERR. Pulse coder PCD generates feedback pulses PF whenever servomotor M2 rotates through a predetermined angle a present position register APR monitors present position $Z_1$ along the Z axis by reversibly counting the feedback pulses PF dependent upon the direction of movement. Upon use, present positions $Z_1$, $X_1$, $Y_1$, $A_1$ ($=\theta_{x1}$) and $B_1$ ($=\theta_{y1}$) along the respective axes are read in from the servo-circuits 12Z-12B of the respective axes.

Upon use tracer control unit 11 first reads distances $L_1$-$L_3$ to the three points on the model from the distance measuring probe every sampling time $T_S$, second obtains the increments $\Delta\theta_x$, $\Delta\theta_y$ of the angles of inclination of the normal line about the A axis and B axis in accordance with Eqs. (1) and (2), and third obtains the angles $\theta_{x2}$, $\theta_{y2}$, about the A and B axes, of the normal line in accordance with Eqs. (3) and (4). Calculation of the angles $\theta_{x1}$, $\theta_{y1}$ in Eqs. (3), (4) use the contents of the present position registers in A-axis servo-circuit 12A and B-axis servo-circuit 12B.

Next, the normal directions $\theta_1$, $\theta_2$ are obtained in accordance with Eqs. (5), (6), and ($L_1-L_0$) is adopted as $\Delta l_1$. Thereafter, the incremental quantities along the three axes of the rectangular coordinate system and the incremental quantities along the two axes of rotation are computed in accordance with Eq. (20) and input to their corresponding servo-circuits 12Z, 12X, 12Y, 12A and 12B. Pulse distribution operations along each of the five axes are executed simultaneously, and the servomotors for their respective axes rotated by the obtained pulses, thereby moving distance measuring probe 13 along the surface of the model.

Thereafter, the tracer control unit repeats the foregoing processing every sampling time $T_S$ to perform contactless profiling of the model while the optic axis OP1 of the distance measuring means DM1 (see FIG. 1) is pointed in the direction of the line normal to the model surface. In such a manner the measured distance $L_1$ becomes equal to the reference distance $L_0$. Digitized data, indicative of the model, can be obtained by reading the present position, stored for each axis in the present position register, every sampling time.

In accordance with the present invention as described above, the distances $L_1$-$L_3$ to the three points on the model can be measured simultaneously, which by contactless profiling is performed while the optic axis is pointed in the direction of the line normal to the model surface using the distances $L_1$-$L_3$. Accurate contactless profiling and an enlarged profiling range are thus possible.

I claim:

1. A method for profiling a model surface by tracing the model surface using a distance measuring probe, the distance measuring probe capable of measuring distances over predetermined sampling times $T_S$ without contacting the model surface, said method comprising the steps of:
   (a) providing first, second and third optical-type distance measuring means in the distance measuring probe for simultaneous distance measurement to at least three points on the model surface;
   (b) maintaining the second optical-type distance measuring means a first predetermined distance apart from the first optical-type distance measuring means in a probe feed direction;
   (c) maintaining the third optical-type distance measuring means a second predetermined distance apart from the first optical-type distance measuring means in a direction perpendicular to the probe feed direction;
   (d) moving the distance measuring probe relative to the model along first, second and third axes of a three-dimensional coordinate system;
   (e) moving the distance measuring probe about fourth and fifth axes;
   (f) measuring, every of the predetermined sampling times $T_S$, first, second and third distances between the distance measuring probe and the at least three points on the model surface using the first, second and third optical-type distance measuring means, respectively;
   (g) computing an inclination angle increment $\Delta\theta_x$ in the probe feed direction using the first and second distances;
   (h) computing an inclination angle increment $\Delta\theta_y$ in the direction perpendicular to the probe feed direction using the first and third distances;
   (i) computing, every of the predetermined sampling times $T_S$, incremental quantities along the first, second and third axes of the rectangular coordinate system and about the fourth and fifth axes of probe rotation required to align an optic axis of the first distance measuring means along a line normal to the model surface at the first point;
   (j) adjusting the incremental quantities along two axes of the rectangular coordinate system, every of the predetermined sampling times $T_S$, in dependence upon a tracing velocity, an inclination angle in the probe feed direction and a component along the third axis of an error between the first distance and a reference distance; and
   (k) performing simultaneous five-axis control of said moving in steps (d) and (e) using the incremental quantities along the first, second and third axes as adjusted in step (j) and using the incremental quantities about the fourth and fifth axes.

2. A contactless profiling method according to claim 1, wherein the inclination angle increment $\Delta\theta_x$ in the probe feed direction is determined every of the predetermined sampling times $T_S$ in accordance with the equation $$\Delta\theta_x = \tan^{-1}(L_1 - L_2)/dl_{12}$$

and the inclination angle increment $\Delta\theta_y$ in the direction perpendicular to the probe feed direction is determined every of the predetermined sampling times $T_S$ in accordance with the equation $$\Delta\theta_y = \tan^{-1}(L_1 - L_3)/dl_{13}$$

where $dl_{12}$ represents the first predetermined distance between the first and second optical-type distance measuring means, $dl_{13}$ represents the second predetermined distance between the first and third optical-type distance measuring means, $L_1$, $L_2$ and $L_3$ represent the first, second and third distances, respectively, measured every of the predetermined sampling times $T_S$.

3. A contactless profiling method according to claim 1, wherein for an additional of the predetermined sampling times, inclination angle $\theta_{x2}$ of the optic axis in the probe feed direction and inclination angle $\theta_{y2}$ of the optic axis in the direction perpendicular to the probe feed direction are determined in accordance with:

$$\theta_{x2} = \theta_{x1} + \Delta\theta_x$$

$$\theta_{y2} = \theta_{y1} + \Delta\theta_y$$

where $\theta_{x1}$ represents inclination angle of the optic axis of the first distance measuring means in the probe feed direction, and $\theta_{y1}$ represents inclination angle of the optic axis of the first distance measuring means in the direction perpendicular to the probe feed direction.

4. A contactless profiling method according to claim 3, wherein incremental quantities $\Delta x$, $\Delta y$, $\Delta z$, $\Delta \theta_x$, $\Delta \theta_y$ along the first, second and third axes of the three-dimensional coordinate system and the fourth and fifth axes of probe rotation are determined in accordance with:

$$\Delta^x = L_1(\cos\theta_2 \cdot \tan\theta_{x2} - \cos\theta_1 \cdot \tan\theta_{x1})$$
$$\Delta^y = L_1(\cos\theta_2 \cdot \tan\theta_{y2} - \cos\theta_1 \cdot \tan\theta_{y1})$$
$$\Delta^z = L_1(\cos\theta_2 - \cos\theta_1)$$
$$\Delta\theta_x = \tan^{-1}(L_2 - L_1)/dl_{12}$$
$$\Delta\theta_y = \tan^{-1}(L_3 - L_1)/dl_{13}$$

where $$\theta_1 = \tan^{-1}(\sqrt{\tan^2\theta_{x1} + \tan^2\theta_{y1}})$$

$$\theta_2 = \tan^{-1}(\sqrt{\tan^2\theta_{x2} + \tan^2\theta_{y2}})$$

where $dl_{12}$ represents the first predetermined distance between the first and second optical-type distance measuring means, $dl_{13}$ represents the second predetermined distance between the first and third optical-type distance measuring means, $L_1$, $L_2$ and $L_3$ represent the first, second and third distances, respectively, measured every of the predetermined sampling times $T_S$.

5. A contactless profiling method according to claim 4, wherein incremental quantities $\Delta X_Q$, $\Delta Z_Q$ along their corresponding axes of the rectangular coordinate system, for every of the predetermined sampling times $T_S$, are determined from the tracing velocity V and the inclination angle $\theta_{x1}$ in the probe feed direction in accordance with:

$$\Delta X_Q = V \cdot \cos \theta_{x1} \cdot T_S$$

$$\Delta Z_Q = V \cdot \cos \theta_{x1} \cdot T_S.$$

6. A contactless profiling method according to claim 1, further comprising the step of calculating the location of a point on the model surface from measurements obtained by carrying out the contactless profiling.

7. A method for profiling a model surface by tracing the surface with a distance measuring probe over predetermined sampling times $T_S$, the distance measuring probe capable of measuring distances without contacting the surface, said method comprising the steps of:

(a) providing a first, a second and a third contactless distance measuring device for simultaneous distance measurement of at least three points on the model surface;

(b) juxtaposing the second contactless distance measuring device a predetermined distance from the first contactless distance measuring device in a probe feed direction;

(c) juxtaposing the third contactless distance measuring device a predetermined distance from the first contactless distance measuring device in a direction perpendicular to the probe feed direction;

(d) measuring, every of the predetermined sampling times $T_S$, incremental distances to two points in the probe feed direction and determining an inclination angle increment $\Delta \theta_x$ in the probe feed direction in accordance with said measured incremental distances to the two points in the probe feed direction;

(e) measuring, every of the predetermined sampling times $T_S$, incremental distances to two points in a direction perpendicular to the probe feed direction and determining an inclination angle increment $\Delta \theta_y$ in a direction perpendicular to the probe feed direction in accordance with said measured incremental distances to two points in a direction perpendicular to the probe feed direction; and (f) determining, every of the predetermined sampling times $T_S$, incremental quantities required to align a measurement line of the first contactless distance measuring device along a line normal to the model surface in accordance with both the inclination angle increment $\Delta \theta_x$ in the probe feed direction and the inclination angle increment $\Delta \theta_y$ in the direction perpendicular to the probe feed direction.

8. A contactless profiling method according to claim 7, further comprising the steps of:

providing for movement of the distance measuring probe along a first, second and third axes of a three-dimensional coordinate system and about fourth and fifth axes of probe rotation; and performing simultaneous five-axis control of movement of the distance measuring probe in accordance with said incremental quantities along the first, second and third axes of the three-dimensional coordinate system and about the fourth and fifth axes of probe rotation.

9. A contactless profiling method according to claim 7, wherein the incremental quantities are adjusted by a tracing velocity and an inclination angle in the probe feed direction.

10. A contactless profiling method according to claim 7, wherein the incremental quantities are adjusted by a Z-axis component of an error between the distance measured by the first distance measuring device every of the predetermined sampling times $T_S$ and a reference distance.

11. A contactless profiling method according to claim 8, wherein the incremental quantities are determined along their corresponding axes of the three-dimensional coordinate system adjusted by a tracing velocity and an inclination angle in the probe feed direction and adjusted by a Z-axis component of an error between the distance measured by the first distance measuring device every of the predetermined sampling times $T_S$ and a reference distance.

12. A contactless profiling method according to claim 7, wherein the inclination angle increment $\Delta \theta_x$ in the probe feed direction is determined every predetermined sampling time $T_S$ in accordance with the equation $$\Delta \theta_x = \tan^{-1}(L_1 - L_2)/dl_{12}$$

and the inclination angle increment $\Delta \theta_y$ in the direction perpendicular to the probe feed direction is determined every of the predetermined sampling times $T_S$ in accordance with the equation $$\Delta \theta_y = \tan^{-1}(L_1 - L_3)/dl_{13}$$

where $dl_{12}$ represents spacing between the first and the second contactless distance measuring device, $dl_{13}$ represents spacing between the first and the third contactless distance measuring device, $L_1$, $L_2$ represent distances to two points in the probe feed direction measured every of the predetermined sampling times $T_S$, and $L_1$, $L_3$ represent distances to two points in the direction perpendicular to the probe feed direction measured every of the predetermined sampling times $T_S$.

13. A contactless profiling method according to claim 8, wherein for an additional of the predetermined sampling times, inclination angle $\theta_{x2}$ of the measurement line in the probe feed direction and inclination angle $\theta_{y2}$ of the measurement line in the direction perpendicular to the probe feed direction are determined in accordance with:

$$\theta_{x2} = \theta_{x1} + \Delta\theta_x$$

$$\theta_{y2} = \theta_{y1} + \Delta\theta_y.$$

where $\theta_{x1}$ represents inclination angle of the measurement line of the first distance measuring device in the probe feed direction, and $\theta_{y1}$ represents inclination angle of the measurement line of the first distance measuring device in the direction perpendicular to the probe feed direction.

14. A contactless profiling method according to claim 13, wherein incremental quantities $\Delta x$, $\Delta y$, $\Delta z$, $\Delta\theta_x$, $\Delta\theta_y$ along the first, second and third axes of the three-dimensional coordinate system and the fourth and fifth axes of probe rotation are determined in accordance with:

$$\Delta^x = L_1(\cos\theta_2 \cdot \tan\theta_{x2} - \cos\theta_1 \cdot \tan\theta_{x1})$$
$$\Delta^y = L_1(\cos\theta_2 \cdot \tan\theta_{y2} - \cos\theta_1 \cdot \tan\theta_{y1})$$
$$\Delta^z = L_1(\cos\theta_2 - \cos\theta_1)$$
$$\Delta\theta_x = \tan^{-1}(L_2 - L_1)/dl_{12}$$
$$\Delta\theta_y = \tan^{-1}(L_3 - L_1)/dl_{13}$$

where $$\theta_1 = \tan^{-1}(\sqrt{\tan^2\theta_{x1} + \tan^2\theta_{y1}})$$

$$\theta_2 = \tan^{-1}(\sqrt{\tan^2\theta_{x2} + \tan^2\theta_{y2}})$$

where $dl_{12}$ represents the first predetermined distance between the first and second contactless distance measuring device, $dl_{13}$ represents the second predetermined distance between the first and third contactless distance measuring device. $L_1$ and $L_2$ represent distances to the two points in the probe feed direction and $L_1$ and $L_3$ represent distances to two points in a direction perpendicular to the probe feed direction measured every of the predetermined sampling times $T_S$.

15. A contactless profiling method according to claim 14, wherein incremental quantities $\Delta X_Q$, $\Delta Z_Q$ along their corresponding axes of the three-dimensional coordinate system, for every of the predetermined sampling times $T_S$, are determined from the tracing velocity V and the inclination angle $\theta_{x1}$ in the probe feed direction in accordance with:

$$\Delta X_Q = V \cdot \cos\theta_{x1} T_S$$

$$\Delta Z_Q = V \cdot \cos\theta_{x1} T_S.$$

16. A contactless profiling method according to claim 8, further comprising the step of calculating the location of a point on the model surface from measurements obtained by carrying out the contactless profiling.

17. An apparatus for profiling a surface of a model by tracing the model surface, said apparatus comprising:

a distance measuring probe capable of measuring distances, said distance measuring probe including:
a first distance measuring device capable of measuring a distance along a first measurement line from said first distance measurement device to a first point on the model surface;
a second distance measuring device arranged a first predetermined distance from the first distance measuring device in a probe feed direction; and
a third distance measuring device arranged a second predetermined distance from the first distance measuring device in a direction perpendicular to the probe feed direction;
a first servo unit to move the distance measuring probe relative to the model along first, second and third axes of a three-dimensional coordinate system;
a second servo unit to move the distance measuring probe about fourth and fifth axes of probe rotation; and
a controller to compute an inclination angle increment $\Delta\theta_x$ in a probe feed direction using first and second distances measured between said first and second distance measuring devices and the surface, to compute an inclination a angle increment $\Delta\theta_y$ in a direction perpendicular to the probe feed direction using first and third distances measured between said first and third distance measuring devices and the surface, to compute incremental quantities along the first, second and third axes of the three-dimensional coordinate system and the fourth and fifth axes of the probe rotation required to align the first measurement line of said first distance measuring device along a line normal to the surface at the first point, and to control simultaneous five-axis control of said first and second servo unit using the incremental quantities along the first, second and third axes and using the incremental quantities about the fourth and fifth axes.

18. An apparatus according to claim 17, wherein said controller adjusts the incremental quantities along corresponding axes of the three-dimensional coordinate system in accordance with a tracing velocity and an inclination angle in the probe feed direction.

19. An apparatus according to claim 17, wherein said controller adjusts the incremental quantities in accordance with a Z-axis component of an error between a reference distance and the distance measured by said first distance measuring device.

20. An apparatus for profiling according to claim 17, wherein said controller adjusts the incremental quantities along corresponding axes of the three-dimensional coordinate system in accordance with a tracing velocity and an inclination angle in the probe feed direction and a Z-axis component of an error between a reference distance and the distance measured by the first distance measuring device.

21. An apparatus according to claim 17, wherein said controller computes an inclination angle increment $\Delta\theta_x$ in the probe feed direction and an inclination angle increment $\Delta\theta_y$ in the direction perpendicular to the probe feed direction, where $$\Delta\theta_x = \tan^{-1}(L_1 - L_2)/dl_{12},$$

$$\Delta\theta_y = \tan^{-1}(L_1 - L_3)/dl_{13}.$$

dl$_{12}$ represents the first predetermined distance between said first and second distance measuring devices, dl$_{13}$ represents the second predetermined distance between said first and third distance measuring devices and L$_1$, L$_2$ and L$_3$ represent distances to three points on the surface from said distance measuring probe, measured by said first, second and third distance measuring devices, respectively.

22. An apparatus according to claim 17, wherein said controller computes an inclination angle $\theta_{x2}$ of the first measurement line in the probe feed direction and an inclination angle $\theta_{y2}$ of the first measurement line in the direction perpendicular to the probe feed direction, where $$\theta_{x2} = \theta_{x1} + \Delta\theta_x$$

$$\theta_{y2} = \theta_{y1} + \Delta\theta_y$$

$\theta_{x1}$ represents an inclination angle of the first measurement line of the first distance measuring device in the probe feed direction, and $\theta_{y1}$ represents an inclination angle of the first measurement line of the first distance measuring device in the direction perpendicular to the probe feed direction.

23. The apparatus for profiling according to claim 22, wherein said controller calculates the incremental quantities $\Delta x$, $\Delta y$, $\Delta z$, $\Delta\theta_x$, $\Delta\theta_y$, along the first, second and third axes of the three-dimensional coordinate system and the fourth and fifth axes of probe rotation, where $$\Delta^x = L_1(\cos\theta_2 \cdot \tan\theta_{x2} - \cos\theta_1 \cdot \tan\theta_{x1}),$$
$$\Delta^y = L_1(\cos\theta_2 \cdot \tan\theta_{y2} - \cos\theta_1 \cdot \tan\theta_{y1}),$$
$$\Delta^z = L_1(\cos\theta_2 - \cos\theta_1),$$
$$\Delta\theta_x = \tan^{-1}(L_2 - L_1)/dl_{12},$$
$$\Delta\theta_y = \tan^{-1}(L_3 - L_1)/dl_{13},$$
$$\theta_1 = \tan^{-1}(\sqrt{\tan^2\theta_{x1} + \tan^2\theta_{y1}})$$
$$\theta_2 = \tan^{-1}(\sqrt{\tan^2\theta_{x2} + \tan^2\theta_{y2}})$$

where dl$_{12}$ represents the first predetermined distance between said first and second distance measuring devices, dl$_{13}$ represents the second predetermined distance between said first and third distance measuring devices, and L$_1$, L$_2$ and L$_3$ represent the first, second and third distances, respectively.

24. An apparatus for profiling according to claim 17, further comprising an output port for outputting the location of a point on the surface measured by said first distance measurement device.

25. A method for profiling normal to a model surface by tracing the model surface over predetermined sampling times T$_S$, said method comprising the steps of:
  (a) measuring, every of the predetermined sampling times, first, second and third distances along first, second and third measurement lines, respectively, between a distance measuring probe and at least three points on the model surface;
  (b) computing a first inclination angle increment in a first direction using the first and second distances;
  (c) computing a second inclination angle increment in a direction perpendicular to the first direction using the first and third distances;
  (d) determining, every of the predetermined sampling times, total incremental quantities along first, second and third axes of a three-dimensional coordinate system and fourth and fifth axes of probe rotation required to align the first measurement line of the distance measuring probe along a line normal to the model surface; and
  (e) performing simultaneous five-axis control of movement of the distance measuring probe relative to the model, along the first, second and third axes of the three-dimensional coordinate system and about the fourth and fifth axes of probe rotation in accordance with the total incremental quantities.

26. A method according to claim 25, wherein the total incremental quantities are determined in accordance with incremental quantities along corresponding axes of the three-dimensional coordinate system adjusted by a tracing velocity and an inclination angle in the first direction.

27. A method according to claim 25, wherein the total incremental quantities are determined in accordance with incremental quantities adjusted by a Z-axis component of an error between the first distance and a reference distance.

28. A method according to claim 25, wherein the total incremental quantities are determined in accordance with incremental quantities along their corresponding axes of the three-dimensional coordinate system adjusted by a tracing velocity and an inclination angle in the first direction and adjusted by a Z-axis component of an error between the first distance and a reference distance.

* * * * *

UNITED STATES PATENT AND TRADEMARK OFFICE
CERTIFICATE OF CORRECTION

PATENT NO. : 5,071,252

DATED : December 10, 1991

INVENTOR(S) : Matsuura

It is certified that error appears in the above-identified patent and that said Letters Patent is hereby corrected as shown below:

Col. 5, line 66 (second from bottom) change "$_\Delta 1$" to --$_\Delta \ell_1$--.

Col. 6, line 52, after "etc." start a NEW PARAGRAPH, and change "each" to --Each--;
line 59, change "for accumulating" to --accumulates--;
line 64, change "M2" to --MZ--;
line 67, change "M2" to --MZ--;
line 68, change "a present" to --Present--.

Col. 7, line 13, change "$\theta_{y2}$," to --$\theta_{y2}$--;
line 43, change simultaneously, which by" to --simultaneously whereby--.

Signed and Sealed this

Twenty-fifth Day of May, 1993

Attest:

MICHAEL K. KIRK

Attesting Officer

Acting Commissioner of Patents and Trademarks